US006950902B2

(12) United States Patent
Sakai et al.

(10) Patent No.: US 6,950,902 B2
(45) Date of Patent: Sep. 27, 2005

(54) CACHE MEMORY SYSTEM

(75) Inventors: Atsushi Sakai, Tokyo (JP); Hideharu Amano, Yokohama (JP)

(73) Assignee: Semiconductor Technology Academic Research Center, Kanagawa (JP)

( * ) Notice: Subject to any disclaimer, the term of this patent is extended or adjusted under 35 U.S.C. 154(b) by 147 days.

(21) Appl. No.: 10/076,625

(22) Filed: Feb. 19, 2002

(65) Prior Publication Data

US 2002/0116578 A1 Aug. 22, 2002

(30) Foreign Application Priority Data

Feb. 21, 2001 (JP) .................................... P2001-045072

(51) Int. Cl.[7] ................................................ G06F 12/00
(52) U.S. Cl. ........................................ 711/118; 711/128
(58) Field of Search ................................ 711/118, 128, 711/135, 137

(56) References Cited

U.S. PATENT DOCUMENTS 6,131,145 A 10/2000 Matsubara et al. ......... 711/137

OTHER PUBLICATIONS

Jim Handy, The Cache Memory Book, 1998, Academic Press Inc., 2nd ed., pp 51–54.*
Takashi Fujiwara et al, A Custom Processor for the Multiprocessor System ASCA, 1998, IASTED 16th International Conference on Applied Informatics, pp 258–261.*
Jim Handy, The Cache Memory Book, 1998, Academic Press Inc., 2nd ed., pp 44–47, 204.*
Erik G. Hallnor et al, A Fully Associative Software–Managed Cache Design, 2000, ACM Press, pp 107–116.*
Sakamoto, Katsuto., et al. "Software Controlled Cache for Multi–grain Parallel Processing." The Institute of Electronics, Information and Communications Engineers, Technical Report of IEICE, ICD98–26, CPSY98–11–26, Apr. 4, 24, 1998, pp. 117–124.

Iwai, K., et al. " ASCA: A multiprocessor architecture Intitiated by a compiler." Joint Symposium on Parallel Processing 2000, JSPP2000, May 12, 2000, pp. 3–10.

Nakamura, Hiroshi., et al. "SCIMA: A New Architecture for High Performance Computing." Proceedings of Information Processing Society of Japan; Transactions on High Performance Computing Systems. Aug. 15, 2000, vol. 41. No.: SIG5(HPS1) pp. 15–27.

"Reducing Memory Penalty by a Programmable Prefetch Engine for On–Chip Caches" Tien–Fu Chen *Microprocessors and Microsystems* V.21 No. 2 (Oct. 1, 1997) pp. 121–130.

"SCIMA: Software Controlled Integrated Memory Architecture for High Performance Computing" Masaki Kondo et al., International Conference on Computer Design in Austin, TX (Sep. 17–20, 2000) pp. 105–111.

"SCIMA: A Novel Processor Architecture for High Performance Computing" Masaki Kondo High Performance Computing in the Asia–Pacific Region http://ieeexplore.ieee.org/ie15/6804/18265/00846477.pdf (May 14–17, 2000) pp. 355–360.

* cited by examiner

*Primary Examiner*—Pierre M. Vital
(74) *Attorney, Agent, or Firm*—McDermott Will & Emery LLP

(57) ABSTRACT

A cache memory system having a small-capacity and high-speed access cache memory provided between a processor and a main memory, including a software cache controller for performing software control for controlling data transfer to the cache memory in accordance with a preliminarily programmed software and a hardware cache controller for performing hardware control for controlling data transfer to the cache memory by using a predetermined hardware such that the processor causes the software cache controller to perform the software control but causes the hardware cache controller to perform the hardware control when it becomes impossible to perform the software control.

8 Claims, 8 Drawing Sheets

*Fig.3*

| TAG | KEY | | | |
|---|---|---|---|---|
| | 1ST WAY | 2ND WAY | 3RD WAY | 4TH WAY |
| 0 | 16 | 24 | — | — |
| 1 | 01 | 09 | 17 | 25 |
| 2 | 18 | 10 | 02 | — |
| 3 | 11 | 43 | 19 | 27 |
| 4 | 20 | 28 | — | — |
| 5 | 05 | 13 | 21 | 29 |
| 6 | 14 | 22 | — | — |
| 7 | 07 | 23 | 31 | — |

*Fig.4*

| TAG | KEY | | | |
|---|---|---|---|---|
| | 1ST WAY | 2ND WAY | 3RD WAY | 4TH WAY |
| 0 | 16 | 24 | — | 37 |
| 1 | 01 | 09 | 17 | 25 |
| 2 | 18 | 10 | 02 | 45 |
| 3 | 11 | 43 | 19 | 27 |
| 4 | 20 | 28 | — | 33 |
| 5 | 05 | 13 | 21 | 29 |
| 6 | 14 | 22 | — | 53 |
| 7 | 07 | 23 | 31 | — |

| TAG | KEY | | | |
|---|---|---|---|---|
| | 1ST WAY | 2ND WAY | 3RD WAY | 4TH WAY |
| 0 | 16 | 24 | — | — |
| 1 | 01 | 09 | 17 | 25 |
| 2 | 18 | 10 | 02 | — |
| 3 | 11 | 43 | 19 | — |
| 4 | 20 | 28 | — | — |
| 5 | 05 | 13 | 21 | — |
| 6 | 14 | 22 | — | — |
| 7 | 07 | 23 | 31 | — |

CACHE MEMORY SYSTEM

BACKGROUND OF THE INVENTION

1. Field of the Invention

The present invention generally relates to a cache memory system including a small-capacity cache memory enabling high-speed access, which is provided between a processor and a main memory and more particularly, to a cache memory system for use in a multiprocessor in which a plurality of processors operate nonsynchronously.

2. Description of the Prior Art

FIG. 14 schematically shows an example of a configuration of a conventional cache memory system 100. In FIG. 14, the cache memory system 100 includes a cache memory unit 102 through which a processor 101 is connected to a main memory 103. The cache memory unit 102 is, in turn, constituted by a tag memory 105, a cache memory 106 and a cache controller 107 for controlling transfer of data to the cache memory 106 with reference to a correspondence table of tags stored in the tag memory 105.

On the other hand, in the cache memory system 100, access time varies according to whether or not data is stored, i.e., hit in the cache memory 106. Thus, in order to raise a cache hit ratio, a prefetch mechanism for preliminarily preparing data in the cache memory 106 may be provided in the cache controller 107. In such a cache memory system 100, in case data to be accessed exists in the cache memory 106, the data is supplied from the cache memory 106 to the processor 101. On the contrary, in case the data to be accessed does not exist in the cache memory 106, the data is supplied from the main memory 103 to the processor 101.

However, in the above mentioned configuration of the conventional cache memory system 100, even if the prefetch mechanism is used by static scheduling technique, it is impossible to achieve a cache hit ratio of 100%. Thus, it is difficult to perform nonsynchronous operation of multiple processors of a multiprocessor by using the conventional cache memory system 100 of FIG. 14 in the multiprocessor.

SUMMARY OF THE INVENTION

Accordingly, an essential object of the present invention is to provide, with a view to eliminating the above mentioned drawbacks of prior art, a cache memory system in which not only by adding both a processor for managing data transfer and an operation mode controlled by software but by providing in a compiler a mechanism for managing line information of a cache memory, multiple processors are capable of operating nonsynchronously without incurring a cache miss.

In order to accomplish this object of the present invention, a cache memory system having a small-capacity cache memory which enables high-speed access and is provided between a processor and a main memory, according to the present invention includes a software cache controller which performs software control for controlling data transfer to the cache memory in accordance with a preliminarily programmed software. The cache memory system further includes a hardware cache controller which performs hardware control for controlling data transfer to the cache memory by using a predetermined hardware. The processor causes the software cache controller to perform the software control but causes the hardware cache controller to perform the hardware control when it becomes impossible to perform the software control.

More specifically, when a cache miss happens at the time of the software control, the processor causes the hardware cache controller to perform the hardware control.

Meanwhile, the software cache controller may store desired data in the cache memory in accordance with a code produced by static prediction of a compiler.

More specifically, before the processor executes a data read-out instruction for reading out desired data of the main memory, the software cache controller reads out data at an address of the main memory designated by the data read-out instruction and stores the data in the cache memory.

Furthermore, at the same time when the processor executes the data read-out instruction, the software cache controller may transfer from the cache memory to the processor the data at the address of the main memory designated by the data read-out instruction.

On the other hand, before the processor executes a data write instruction for writing data in the main memory, the software cache controller designates an address of the cache memory, which is used for storing data from the processor.

Moreover, when the processor executes the data write instruction, the data from the processor written at the designated address the cache memory may be written by the software cache controller at an address of the main memory designated by the data write instruction.

Meanwhile, the hardware cache controller performs line management of the cache memory by using a set-associative method for multiple ways and the software cache controller performs line management of the cache memory by using a fully associative method for at least one way in the multiple ways.

Meanwhile, more specifically, the software cache controller is formed by a transfer control processor for controlling data transfer to the cache memory.

BRIEF DESCRIPTION OF THE DRAWINGS

This object and features of the present invention will become apparent from the following description taken in conjunction with the preferred embodiment thereof with reference to the accompanying drawings in which:

FIG. 3 is a view showing an example of a correspondence table of tags in case a four-way set-associative method is employed;

FIG. 4 is a view showing an example of the correspondence table of the tags of FIG. 3 at the time of software control;

Before the description of the present invention proceeds, it is to be noted that like parts are designated by like reference numerals throughout several views of the accompanying drawings.

DETAILED DESCRIPTION OF THE INVENTION

Hereinafter, one embodiment of the present invention is described with reference to the drawings.

Figure 1:
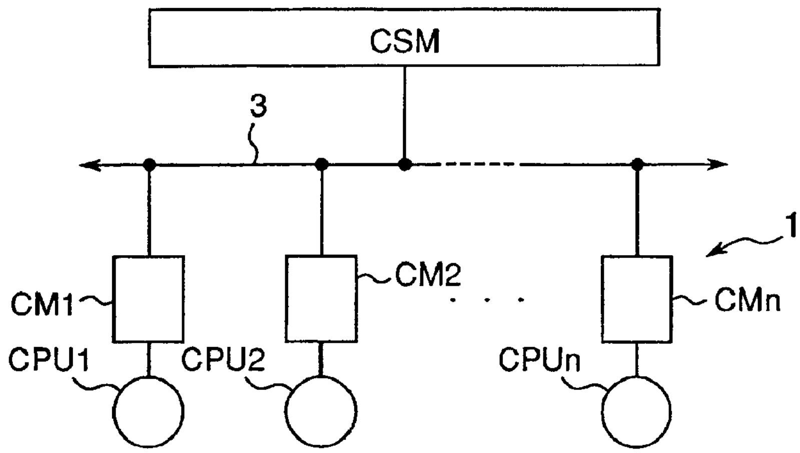
FIG. 1 is a schematic block diagram showing an example of a multiprocessor employing a cache memory system according to one embodiment of the present invention.

FIG. 1 schematically shows an example of a multiprocessor employing a cache memory system 1 according to the embodiment of the present invention. In FIG. 1, the multiprocessor includes a plurality of processors CPU1 to CPUn (n=natural number>1), the cache memory system 1, a centralized shared memory CSM acting as a main memory and a data communication bus 3. The cache memory system 1 includes a plurality of cache memory units CM1 to CMn corresponding to the processors CPU1 to CPUn, respectively. The cache memory units CM1 to CMn are connected to the processors CPU1 to CPUn, respectively. Furthermore, via the data communication bus 3, the cache memory units CM1 to CMn are connected not only to one another but to the centralized shared memory CSM.

In the above described configuration of the multiprocessor, an interprocessor communication system for establishing communication among registers of the respective processors CPU1 to CPUn is employed for forming communication among the processors CPU1 to CPUn. In case amount of communication data is too large to handle by the interprocessor communication system, a plurality of local memories for communication may be provided between the centralized shared memory CSM and the cache memory units CM1 to CMn, respectively. In this case, each of the processors CPUi to CPUn can access the local memories or the centralized shared memory CSM by designating an address.

Figure 2:
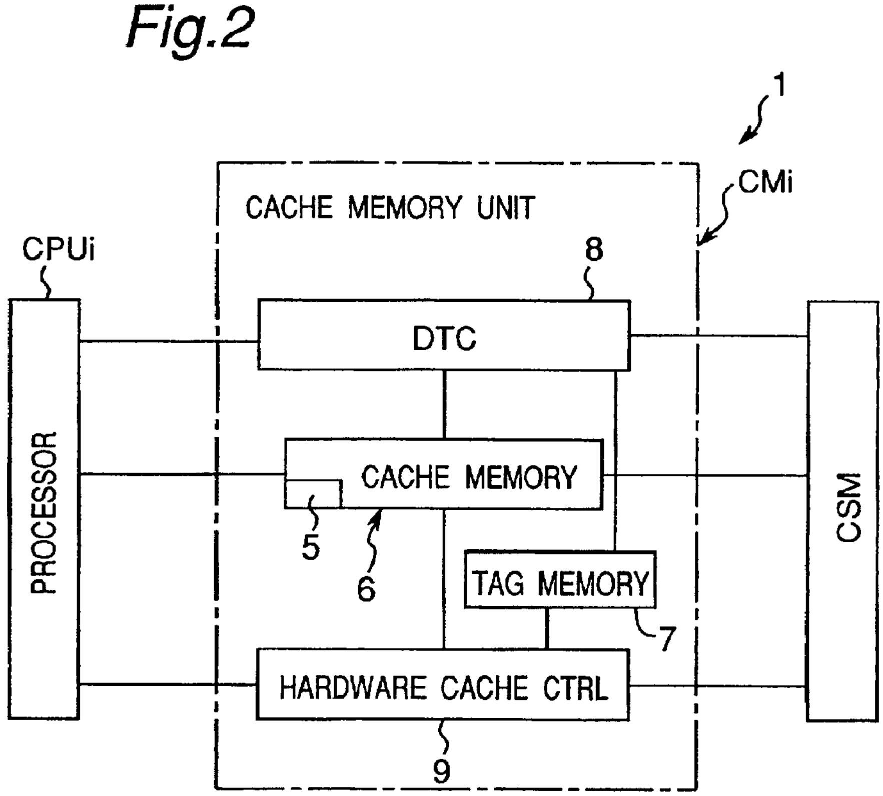
FIG. 2 is a schematic block diagram of the cache memory system of FIG. 1.

FIG. 2 schematically shows the cache memory system 1 of FIG. 1. In FIG. 2, an arbitrary one of the processors CPU1 to CPUn, i.e., a processor CPUi (i=1 to n) is illustrated by way of example. In FIG. 2, the cache memory system 1 is constituted by the processor CPUi, a cache memory unit CMi and the centralized shared memory CSM.

Meanwhile, the cache memory unit CMi is constituted by a cache memory 6 having a read buffer 5, a tag memory 7, a data transfer controller (DTC) 8 for controlling data transfer to the cache memory 6 at the time of software control and a hardware cache controller 9 for controlling data transfer to the cache memory 6 at the time of hardware control. The DTC 8 acts as a software cache controller and includes an address check mechanism for checking address data inputted from the processor CPUi at the time of software control. The DTC 8 is formed by a processor for managing data transfer to the cache memory 6.

Each of addresses of the centralized shared memory CSM is divided into a tag and a key. The tag memory 7 stores a correspondence table of the tags and the keys, indicating at which location of the cache memory 6 data at a specific address of the centralized shared memory CSM is stored. Data management of the correspondence table stored in the tag memory 7 is performed by the DTC 8 at the time of software control and by the hardware cache controller 9 at the time of hardware control. Thus, by checking the tags in the correspondence table of the tag memory 7, the DTC 8 and the hardware cache controller 9 are capable of judging whether or not data at an address of the centralized shared memory CSM requested from the processor CPUi exists in the cache memory 6.

In case the data at the address of the centralized shared memory CSM requested from the processor CPUi exists in the cache memory 6, the hardware cache controller 9 can judge, from the tag, at which address of the cache memory 6 the data is stored, so that the hardware cache controller 9 reads the data from the cache memory 6 to the processor CPUi by designating the address in the cache memory 6. Meanwhile, in case the data at the address of the centralized shared memory CSM requested from the processor CPUi does not exist in the cache memory 6, the hardware cache controller 9 reads the data from the centralized shared memory CSM to the cache memory 6. At this time, the hardware cache controller 9 determines at which address of the cache memory 6 the data read from the centralized shared memory CSM should be stored and stores, by designating the determined address in the cache memory 6, the data at the designated address of the cache memory 6.

It should be noted here that the term "software control" denotes an operation mode in which data is prepared on the cache memory 6 in accordance with a code produced by static prediction of a compiler such that nonsynchronous operation is enabled in a multiprocessor by maintaining a cache hit ratio at 100% in a predetermined interval. On the other hand, "hardware control" is conventional control and thus, the term "hardware control" denotes an operation mode in which mapping in the cache memory 6, confirmation of a cache hit in the cache memory 6, data output from the cache memory 6 and data transfer from the centralized shared memory CSM to the cache memory 6 are not performed until a request is made by the processor CPUi.

Meanwhile, in hardware control, such operations as at which location of the cache memory 6 specific data is stored and which data is eliminated from the cache memory 6 are wholly managed by hardware but future behaviors are not grasped. Thus, layout is determined based on any law utilizing past access pattern. For example, storage location is determined by a four-way set-associative method or the like and data output is managed by a method materialized by hardware such as First In First Out (FIFO) and Least Recently Used (LRU).

FIG. 3 shows an example of a correspondence table of tags stored in the tag memory 7 by employing the four-way set-associative method. The tags of FIG. 3 include eight kinds of tags 0 to 7. In FIG. 3, keys having multiples of eight and {(multiples of eight)+one} in the first to fourth ways are, respectively, allocated to the tag 0 and the tag 1. Thus, supposing that "n" denotes an integer from 0 to 7, keys having {(multiples of eight)+n} in the respective ways are allocated to the tag n. Thus, the keys in the respective ways are located for the tags on the basis of any law. At the time of hardware control, the hardware cache controller 9 performs line management of the cache memory 6 by employing the four-way set-associative method.

On the other hand, the DTC 8 is an processor for controlling data transfer between the processor CPUi and the cache memory 6 and between the cache memory 6 and the centralized shared memory CSM in accordance with an instruction code produced preliminarily by the compiler. Since desired data is prepared in the cache memory 6 beforehand by combining data analysis of the DTC 8 with that of the compiler, a cache hit ratio of 100% can be obtained. Furthermore, at the time of software control, the DTC 8 performs line management of the cache memory 6 by employing a fully associative method only for at least one way and the set-associative method for the remaining ways.

FIG. 4 shows an example of the correspondence table of the tags of FIG. 3 at the time of software control. In FIG. 4, the fully associative method is employed only for the fourth way in the four ways by way of example. Thus, in FIG. 4, line management of the cache memory 6 is performed by employing the set-associative method for the first to third ways in the same manner as that of hardware control and the fully associative method only for the fourth way.

In the set-associative method, layout is determined based on any law as described above. On the other hand, in the fully associative method, unused addresses of the cache memory 6 can be located arbitrarily. Thus, in case data collision occurs in a region of the set-associative method and new data cannot be read unless the data in collision is eliminated, the DTC 8 can read the new data into unused addresses in a region of the fully associative method so as to raise cache utilization efficiency.

Figures 5, 6:
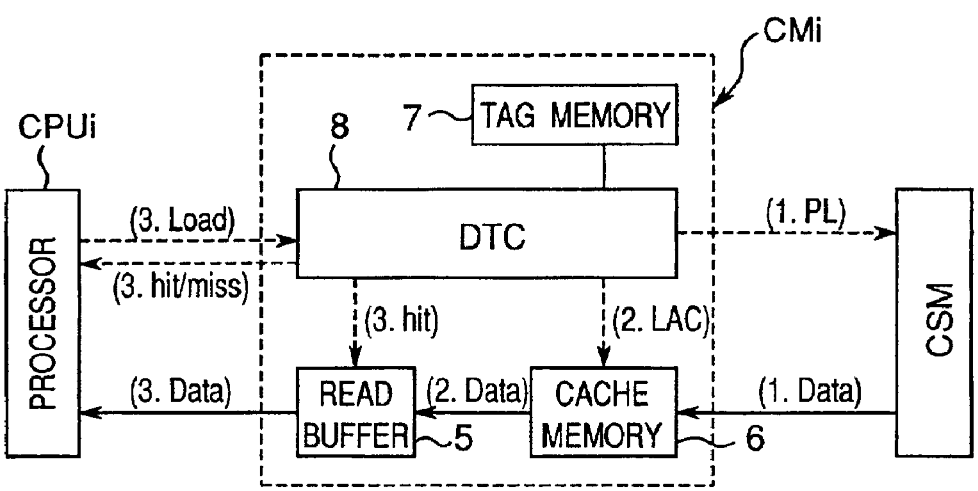
FIG. 5 is a view showing an example of the correspondence table of the tags of FIG. 3 at the time of hardware control changed over from software control of FIG. 4.
FIG. 6 is a block diagram showing an example of operations of portions of the cache memory system of FIG. 2 at the time of execution of preload.

When changeover from software control to hardware control has been made, keys of tags not based on the law of the set-associative method are deleted in the region of the fully associative method by the hardware cache controller 9 such that the correspondence table of the tags is updated as shown in FIG. 5.

Then, instructions produced by the compiler and given to the DTC 8 are described. These instructions for the DTC 8 include instructions LAC and SAC which are issued when the DTC 8 mediates between the cache memory 6 and the processor CPUi and instructions PreLoad (PL) and PostStore (PS) which are issued when the DTC 8 mediates between the cache memory 6 and the centralized shared memory CSM. The instruction LAC is an instruction for causing the processor CPUi to read out data at a specific portion of the cache memory 6, while the instruction SAC is an instruction for causing the processor CPUi to write data at a specific portion of the cache memory 6. Meanwhile, the instruction PL is an instruction for causing data to be read from the centralized shared memory CSM to a specific portion of the cache memory 6, while the instruction PS is an instruction for causing data at a specific portion of the cache memory 6 to be written in the centralized shared memory CSM.

Since software control is performed at a portion where static analysis of data access by the compiler is completely possible, control can be extended up to the cache memory 6 at the time of compiling by utilizing the static analysis and preload, etc. can also be performed. Thus, in case the compiler has controlled the cache memory 6, an address map in the cache memory 6 is naturally managed in the compiler. Hence, the address map does not exist in hardware at the time of actual operation. Therefore, even if the processor CPUi designates an address of the centralized shared memory CSM by a load instruction, it becomes uncertain whether or not at which location of the cache memory 6 data at the address of the centralized shared memory CSM is stored. In order to solve this problem, the load instruction and a store instruction are executed in software control by using the instructions LAC and SAC which designate an address of the cache memory 6.

Formats of instructions executed by the DTC 8 are "LAC cache-addr", "SAC cache-addr", "PL cache-addr mem-addr" and "PS cache-addr mem-addr". Meanwhile, an address of the cache memory 6 is indicated in the format "cache-addr" and an address of the centralized shared memory CSM is indicated in the format "mem-addr". The instruction "LAC cache-addr" is an instruction in which data at the address of the cache memory 6 indicated by the format "cacheaddr" is read so as to be stored in the read buffer 5 temporarily and is outputted to the processor CPUi in one clock from issuing of the load instruction to the processor CPUi. The instruction "LAC cache-addr" is issued to the DTC 8 one clock before the load instruction for reading out the data at the address of the cache memory 6 indicated by the format "cache-addr" is issued to the processor CPUi.

The instruction "SAC cache-addr" is an instruction in which data from the processor CPUi is stored at the address of the cache memory 6 indicated by the format "cache-addr". The instruction "SAC cache-addr" is issued to the DTC 8 one clock before the store instruction for writing the data at the address of the cache memory 6 indicated by the format "cache-addr".

The instruction "PL cache-addr mem-addr" is an instruction in which data at the address of the centralized shared memory CSM indicated by the format "mem-addr" is read and is written at the address of the cache memory 6 indicated by the format "cache-addr". The instruction "PL cache-addr mem-addr" is issued to the DTC 8 at least clocks before the load instruction for reading out the data at the address of the cache memory 6 indicated by the format "cache-addr" is issued to the processor CPUi, which clocks are required for reading the data from the centralized shared memory CSM and writing the data in the cache memory 6.

The instruction "PS cache-addr mem-addr" is an instruction in which data at the address of the cache memory 6 indicated by the format "cache-addr" is read and is written at the address of the centralized shared memory CSM indicated by the format "mem-addr". The instruction "PS cache-addr mem-addr" is issued to the DTC 8 immediately after the store instruction for writing in the centralized shared memory CSM the data at the address of the cache memory 6 indicated by the format "cache-addr" has been issued to the processor CPUi, for example, one clock after the store instruction has been issued to the centralized shared memory CSM.

As described above, the DTC 8 operates in accordance with the instructions subjected to scheduling by the compiler and performs, in software control, such management as to store data at a specific address in the cache memory 6. As a result, since unintended elimination of data in the cache memory 6 can be prevented and unnecessary data can be deleted, etc., a cache hit ratio of 100% can be obtained. In addition, since access of the centralized shared memory CSM by the processor CPUi not only is performed at high speed but is stabilized, it becomes possible to predict operation of the processor CPUi at clock level. Consequently, in the multiprocessor, nonsynchronous operation of the respective processors can be performed.

Then, operations of the processor CPUi and the DTC 8 at the time of software control are described. FIG. 6 shows an example of operations of portions of the cache memory system 1 at the time of execution of preload. The operations of the portions of the cache memory system 1 at the time of execution of preload are described with reference to FIG. 6.

In FIG. 6, numerals "1.", "2." and "3." denote sequence of the operations of the portions of the cache memory system 1, arrows of dotted lines denote flow of control and arrows of solid lines denote flow of data. In FIG. 6, portions irrelevant to operation for software control in the cache memory system 1 are abbreviated.

In FIG. 6, in case preload is executed, the instruction PL is initially issued to the DTC 8 so as to cause the DTC 8 to check that valid data is not stored at an address of the cache memory 6 designated by the instruction PL. In case the valid data is stored at the address of the cache memory 6 designated by the instruction PL, the DTC 8 outputs to the processor CPUi a predetermined miss signal indicative of a cache miss state. Upon input of the miss signal to the processor CPUi, the processor CPUi changes over software control to hardware control using the hardware cache controller 9. Meanwhile, in case the valid data is not stored at the address of the cache memory 6 designated by the instruction PL, the DTC 8 reads out data at an address of the centralized shared memory CSM designated by the instruction PL and stores the data at the address of the cache memory 6 designated by the instruction PL.

Then, the instruction LAC is issued to the DTC 8 so as to cause the DTC 8 to read out data at an address of the cache memory 6 designated by the instruction LAC and store the data in the read buffer 5. Subsequently, a load instruction is issued to the processor CPUi so as to cause the processor CPUi to output to the DTC 8 an address of the centralized shared memory CSM designated by the load instruction. The DTC 8 checks whether or not the inputted address coincides with the address of the centralized shared memory CSM designated by the instruction PL. If the inputted address coincides with the address of the centralized shared memory CSM designated by the instruction PL, the DTC 8 outputs to each of the processor CPUi and the read buffer 5 a hit signal indicative of a cache hit state. Upon input of the hit signal to the read buffer 5, the read buffer 5 outputs to the processor CPUi data stored in the read buffer 5. Thus, preload has been performed by the DTC 8.

On the other hand, if the inputted address does not coincide with the address of the centralized shared memory CSM designated by the instruction PL, the DTC 8 outputs the miss signal to the processor CPUi. Upon input of the miss signal to the processor CPUi, the processor CPUi changes over software control to hardware control using the hardware cache controller 9.

Figure 7:
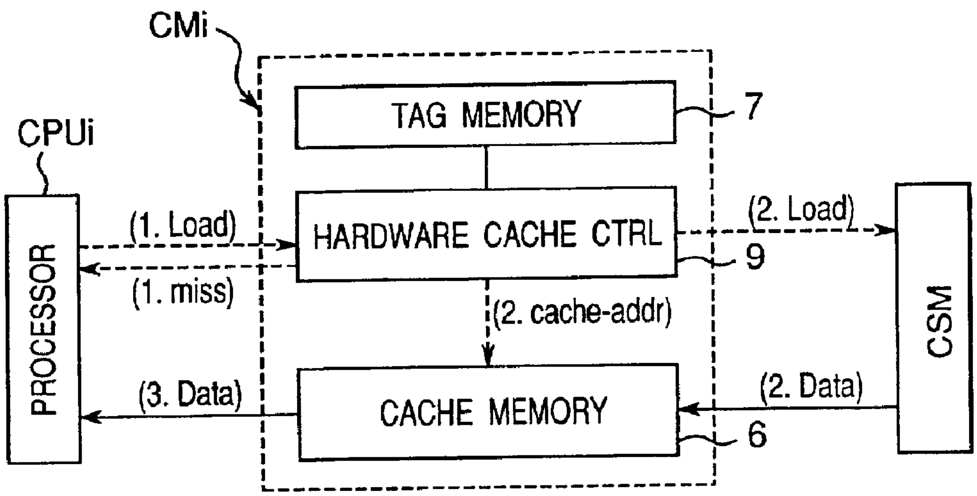
FIG. 7 is a block diagram showing an example of operations of portions of the cache memory system of FIG. 2 in a cache miss state at the time of hardware control.

FIG. 7 shows an example of operations of portions of the cache memory system 1 in the cache miss state upon execution of a load instruction at the time of software control. In FIG. 7, the load instruction is issued to the processor CPUi so as to cause the processor CPUi to output to the hardware cache controller 9 an address of the centralized shared memory CSM designated by the load instruction. At this time, the tag memory 7 stores a tag correspondence table indicating at which location of the cache memory 6 data at a specific address of the centralized shared memory CSM is stored. The hardware cache controller 9 manages contents of the tags stored in the tag memory 7 at the time of hardware control.

The hardware cache controller 9 checks the tags to judge whether or not data at the address of the centralized shared memory CSM exists in the cache memory 6, with the address being inputted to the hardware cache controller 9 from the processor CPUi. If the data at the address of the centralized shared memory CSM designated from the processor CPUi does not exist in the cache memory 6, the hardware cache controller 9 outputs the miss signal to the processor CPUi. Subsequently, the hardware cache controller 9 reads from the centralized shared memory CSM the data at the address of the centralized shared memory CSM designated from the processor CPUi so as to store the data in the cache memory 6 and updates the tag correspondence table in the tag memory 7. Furthermore, on the basis of the updated tag correspondence table, the hardware cache controller 9 reads from the cache memory 6 the data at the address designated by the processor CPUi and outputs the data to the processor CPUi.

Figure 8:
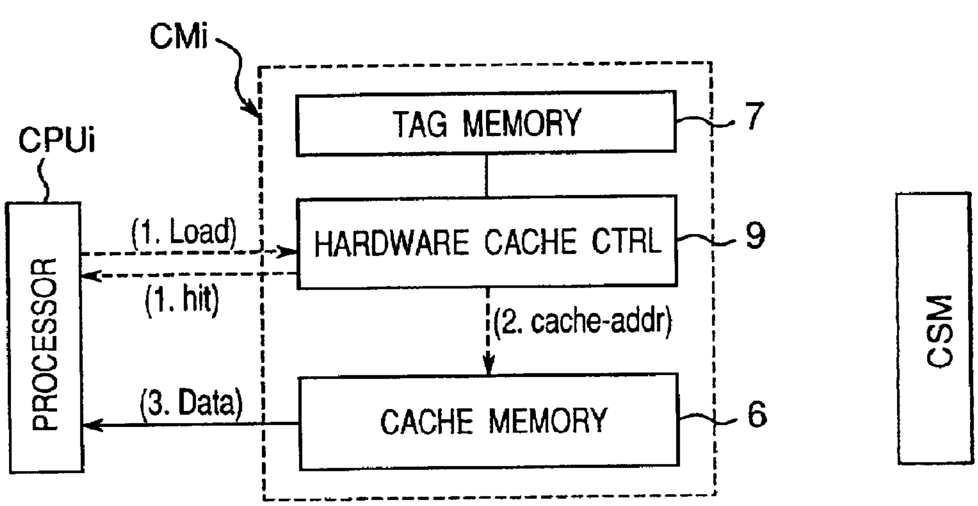
FIG. 8 is a block diagram showing an example of operations of portions of the cache memory system of FIG. 2 in a cache hit state at the time of hardware control.

On the other hand, FIG. 8 shows an example of operations of portions of the cache memory system 1 in the cache hit state upon execution of a load instruction at the time of hardware control. In FIG. 8, the load instruction is issued to the processor CPUi so as to cause the processor CPUi to output to the hardware cache controller 9 an address of the centralized shared memory CSM designated by the load instruction. The hardware cache controller 9 checks the tags to judge whether or not data at the address of the centralized shared memory CSM exists in the cache memory 6, with the address being inputted to the hardware cache controller 9 from the processor CPUi. If the data at the address of the centralized shared memory CSM designated from the processor CPUi exists in the cache memory 6, the hardware cache controller 9 outputs the hit signal to the processor CPUi. Subsequently, on the basis of the tag correspondence table, the hardware cache controller 9 reads from the cache memory 6 the data at the address designated from the processor CPUi and outputs the data to the processor CPUi. Thus, hardware control has been performed.

Figure 9:
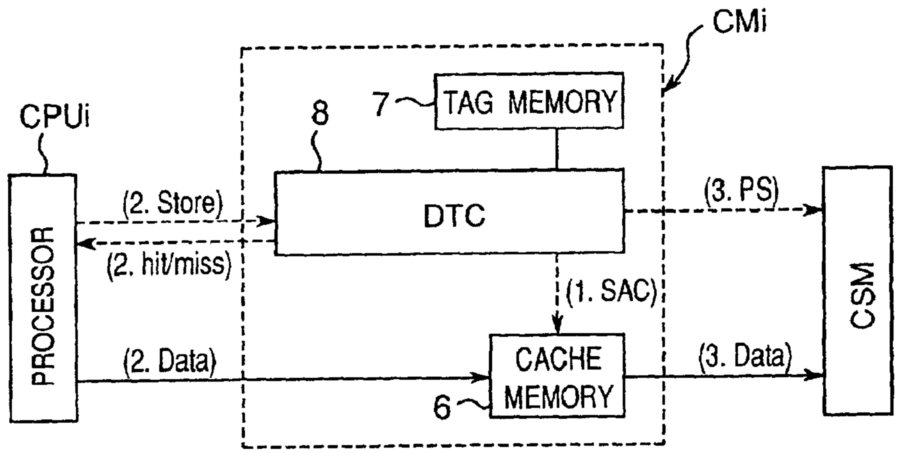
FIG. 9 is a block diagram showing an example of operations of portions of the cache memory system of FIG. 2 at the time of execution of poststore.

Then, FIG. 9 shows an example of operations of portions of the cache memory system 1 at the time of execution of poststore. The operations of the portions of the cache memory system 1 at the time of execution of poststore are described with reference to FIG. 9. Also in FIG. 9, numerals "1.", "2." and "3." denote sequence of the operations of the portions of the cache memory system 1, arrows of dotted lines denote flow of control and arrows of solid lines denote flow of data. In FIG. 9, portions irrelevant to operation for software control in the cache memory system 1 are abbreviated. In case poststore is performed in FIG. 9, the instruction SAC is initially issued to the DTC 8 so as to cause the DTC 8 to control operation of the cache memory 6 such that data is written at an address of the cache memory 6 designated by the instruction SAC.

Then, a store instruction is issued to the processor CPUi so as to cause the processor CPUi to output to the DTC 8 an address of the centralized shared memory CSM designated by the store instruction. In addition, the processor CPUi outputs data to the cache memory 6 so as to store the data at the address of the cache memory 6 designated by the instruction SAC. The DTC 8 obtains from the tags an address of the centralized shared memory CSM in the data stored in the cache memory 6 and checks whether or not the address of the centralized shared memory CSM in the data stored in the cache memory 6 coincides with the address of the centralized shared memory CSM designated by the store instruction. If the address of the centralized shared memory CSM in the data stored in the cache memory 6 does not coincide with the address of the centralized shared memory CSM designated by the store instruction, the DTC 8 outputs the miss signal to the processor CPUi. On the contrary, if the address of the centralized shared memory CSM in the data stored in the cache memory 6 coincides with the address of the centralized shared memory CSM designated by the store instruction, the DTC 8 outputs the hit signal to the processor CPUi. Upon input of the hit signal to the processor CPUi, the processor CPUi continues software control. Meanwhile, upon input of the miss signal to the processor CPUi, the processor CPUi changes over software control to hardware control using the hardware cache controller 9.

Subsequently, the instruction PS is issued to the DTC 8 so as to cause the DTC 8 to check whether or not data stored at an address of the cache memory 6 designated by the instruction PS is valid. If the data stored at the address of the cache memory 6 designated by the instruction PS is valid, the DTC 8 transfers the data to the centralized shared memory CSM and invalidates the data. Meanwhile, if the data is invalid, the DTC 8 issues the miss signal to the processor CPUi and changes over software control to hardware control using the hardware cache controller 9.

Thus, poststore has been performed by the DTC 8. Meanwhile, in preload or poststore referred to above, in case it is not necessary to access the centralized shared memory CSM, for example, data is still being used by the processor CPUi, a program code for the DTC 8 is produced such that the instruction PL or the instruction PS is not issued.

Figure 10:
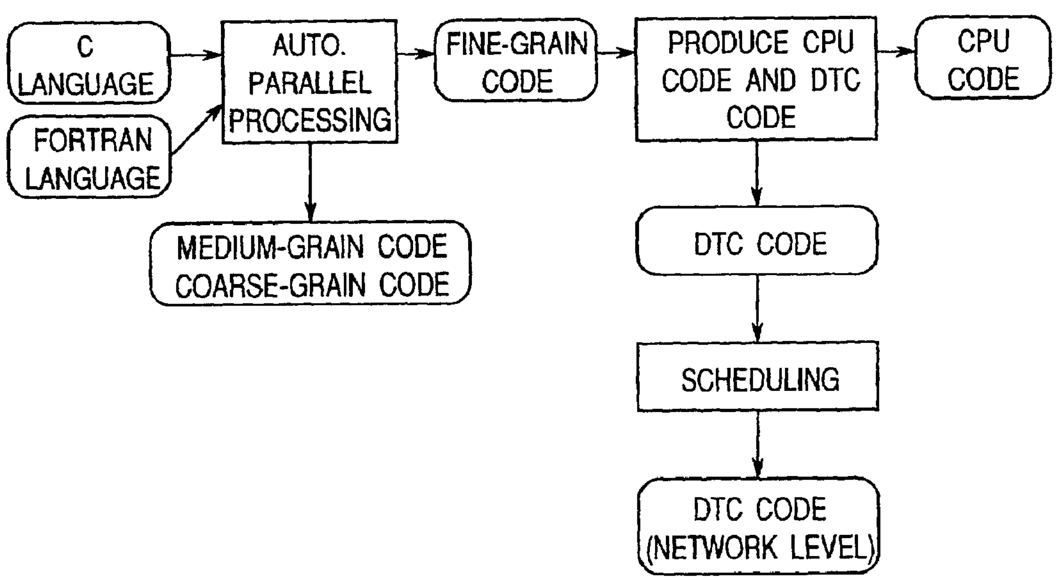
FIG. 10 is a block diagram showing a process in which assembler codes and DTC codes are produced by a compiler.

Timing of issuing the instructions to the processor CPUi and the DTC 8 is preliminarily subjected to scheduling by the compiler. Hereinafter, this scheduling method is described. FIG. 10 shows a process in which assembler codes for the processor CPUi and DTC codes for the DTC 8 are produced by the compiler. Meanwhile, processings illustrated in blocks of FIG. 10 are performed by the compiler which is usually materialized by a computer such as a workstation. In FIG. 10, automatic parallel processing of a sequential program programmed by C language or FORTRAN language is performed initially. The program is divided according to parallelism into three grains including a coarse-grain, a medium-grain and a fine-grain. Automatic parallel processing is briefly described here. In automatic parallel processing, the program as a whole is segmented at the branches into a series of branch-free programs, which are referred to as "coarse-grain tasks" or "tasks".

In coarse-grain parallel operation, it is initially found whether or not the tasks are dependent on one another. If it is found that the tasks are not dependent on one another, the tasks are subjected to parallel processing. Then, in medium-grain parallel operation, investigation of the tasks is performed so as to find whether or not the tasks form a loop enabling parallel operation more simply, namely, a loop not dependent on data calculated by each iteration. If it is found that the tasks form the loop enabling parallel operation, parallel operation is performed. Such medium-grain parallel operation is also referred to as "loop-level-parallel operation". Then, near fine-grain parallel operation is a parallel technique applied to a case in which the tasks do not form a loop or form a loop impossible to perform parallel operation. In near fine-grain parallel operation, parallelism among program statements such as "a=b+c" is extracted.

Subsequently, by using near fine-grain codes which not only are codes having subjected to the above described near fine-grain parallel processing but are a series of branchless instruction codes for the processor CPUi, the assembler CPU codes are produced and the DTC codes are produced based on the produced CPU codes. On the other hand, in order to operate the DTC 8 strictly at clock level, it is necessary to predict even collision of network buckets occurring due to data load, data store, etc. Hence, this prediction is made by performing scheduling at network level such that the DTC codes completely guaranteeing operation at clock level are produced.

Then, layout algorithm of instructions for the DTC 8 at the time of software control based on static prediction of the compiler, which is executed when the DTC codes are produced based on the CPU codes produced from the above mentioned fine-grain codes, is described. Initially, the compiler produces the assembler CPU codes by ordinary compiler technology and searches the produced CPU codes for a load instruction for loading data and a store instruction for writing data so as to produce corresponding DTC instructions, i.e., the instruction LAC, the instruction SAC, the instruction PL and the instruction PS.

Subsequently, on the precondition that a cache hit of data to be loaded or stored should happen without fail, the compiler simulates the produced CPU codes and calculates accurate clocks of the respective instructions. Moreover, the compiler adjusts issuing time of the DTC instructions, i.e., the instructions LAC, SAC, PL and PS so as to ensure that data is present in the cache memory 6 when loaded or stored by the processor CPUi.

A method of determining issuing time of the DTC instructions, which is carried out by the compiler, is described here. In execution instructions of the processor CPUi, execution clocks are determined in increasing order of execution from "0". Execution clocks of a DTC instruction code are based on execution clocks of an instruction code of the processor CPUi. Therefore, DTC instructions which are executed before a first instruction is executed by the processor CPUi have minus execution clocks. Meanwhile, the number of instructions which can be executed for each clock by each of the processor CPUi and the DTC 8 is only one.

The compiler locates the instructions LAC and SAC in the DTC instruction code so as to ensure that not only the instruction LAC is executed one clock before the load instruction of the processor CPUi but the instruction SAC is executed one clock after the store instruction of the processor CPUi and prevents shift of the located instructions LAC and SAC. Thereafter, the compiler locates the instruction PL in the DTC instruction code in accordance with a predetermined algorithm and then, locates the instruction PS in the DTC instruction code in accordance with a predetermined algorithm.

When the DTC 8 executes the instruction PL or PS at this time, several tens of clocks are required for accessing the centralized shared memory CSM. Thus, during this period, the compiler cannot locate in the DTC instruction code an instruction for accessing the centralized shared memory CSM. Meanwhile, hereinafter, a clock range required for accessing the centralized shared memory CSM at the time of execution of the instruction PL is referred to as a "load range" and a clock range required for accessing the centralized shared memory CSM at the time of execution of the instruction PS is referred to as a "store range".

On the other hand, without allocating the instructions PL and PS to all the load instructions and the store instructions in the processor CPUi, the compiler calculates life time of data and allocates the instruction PL to the load instruction at the time of first loading by the processor CPUi and allocates the instruction PS to the store instruction at the time of last storing by the processor CPUi. Meanwhile, in other cases than this one, data is stored in the cache memory 6 and thus, the compiler causes the DTC 8 to perform processing based on the instructions LAC and SAC.

Figure 11:
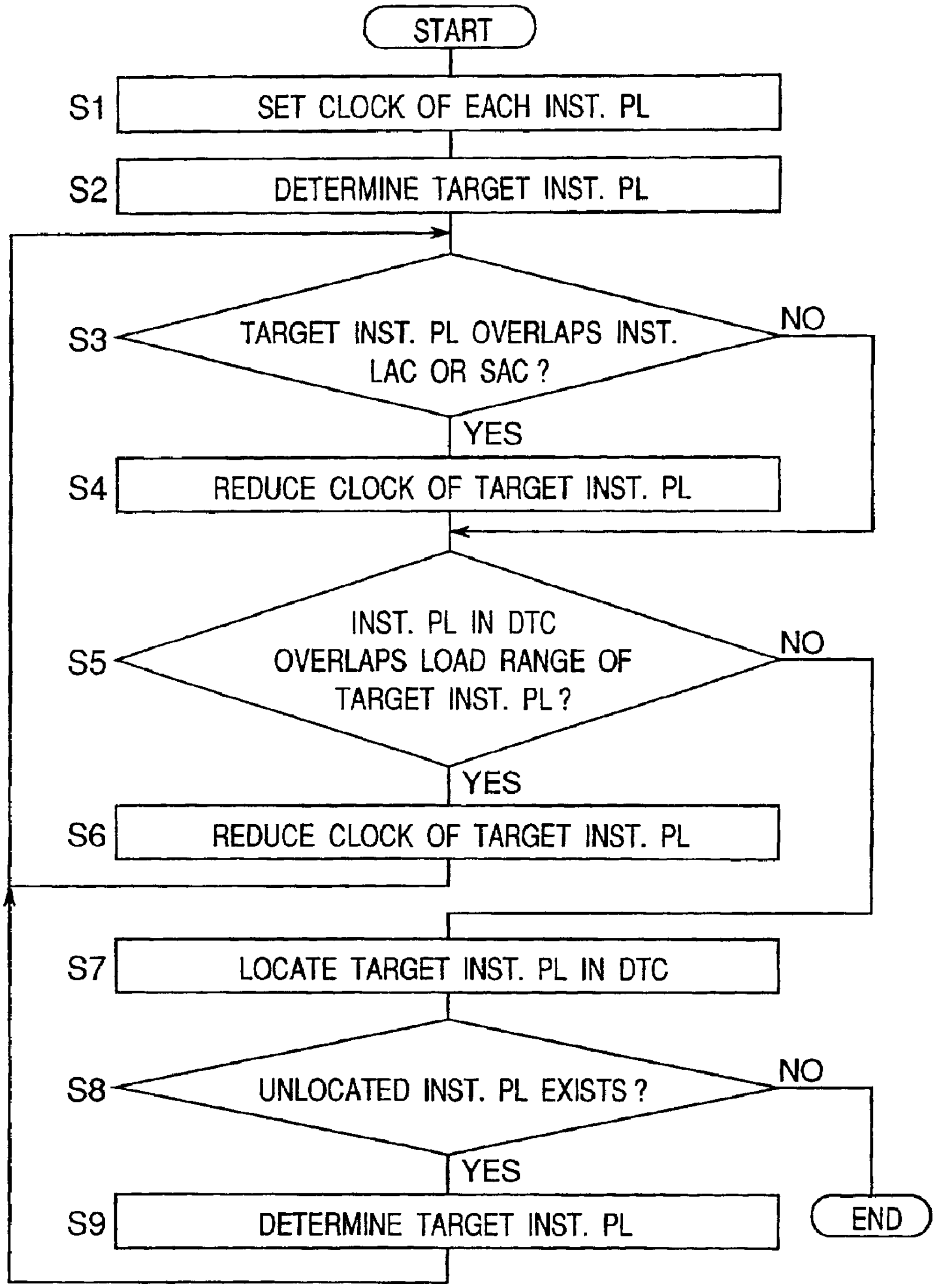
FIG. 11 is a flowchart showing a layout algorithm of an instruction PreLoad (PL) produced by the compiler.

FIG. 11 is a flowchart showing a layout algorithm of the instruction PL produced by the compiler. A layout method of the instruction PL is described with reference to FIG. 11 in which processings of the program flow are performed by the compiler unless otherwise specified. In FIG. 11, at step S1, a clock obtained by subtracting from a load instruction execution clock of the processor CPUi the number of clocks required for accessing the centralized shared memory CSM is initially set at a provisional execution clock of each instruction PL. Then, at step S2, an instruction PL having the largest execution clock, namely, an instruction PL which is lastly executed is determined as a target instruction PL.

Thereafter, at step S3, it is found whether or not the target instruction PL overlaps the instruction LAC or SAC located already in the DTC instruction code. In the case of "YES" at step S3, the execution clock of the target instruction PL is reduced to a value at which the target instruction PL does not overlap the instructions LAC and SAC at step S4. Subsequently, it is found at step S5 whether or not an instruction PL located at present in the DTC instruction code overlaps a load range of the target instruction PL to be located. In the case of "YES" at step S5, the execution clock of the target instruction PL is reduced to a value at which the instruction PL located at present in the DTC instruction code does not overlap the load range of the target instruction PL at step S6. Then, the program flow returns to step S3. On the contrary, in the case of "No" at step S3, the program flow proceeds to step S5.

Subsequently, in the case of "NO" at step S5, the target instruction PL is located in the DTC instruction code at a present execution clock at step S7. Thereafter, it is found at step S8 whether or not there are instructions PL which are not set in the DTC instruction code. In the case of "YES" at step S8, an instruction PL having the largest execution clock in the instructions PL which are not set in the DTC instruction code is determined as the target instruction PL at step S9 and the program flow returns to step S3. Meanwhile, in the case of "NO" at step S8, the program flow is terminated.

Figure 12:
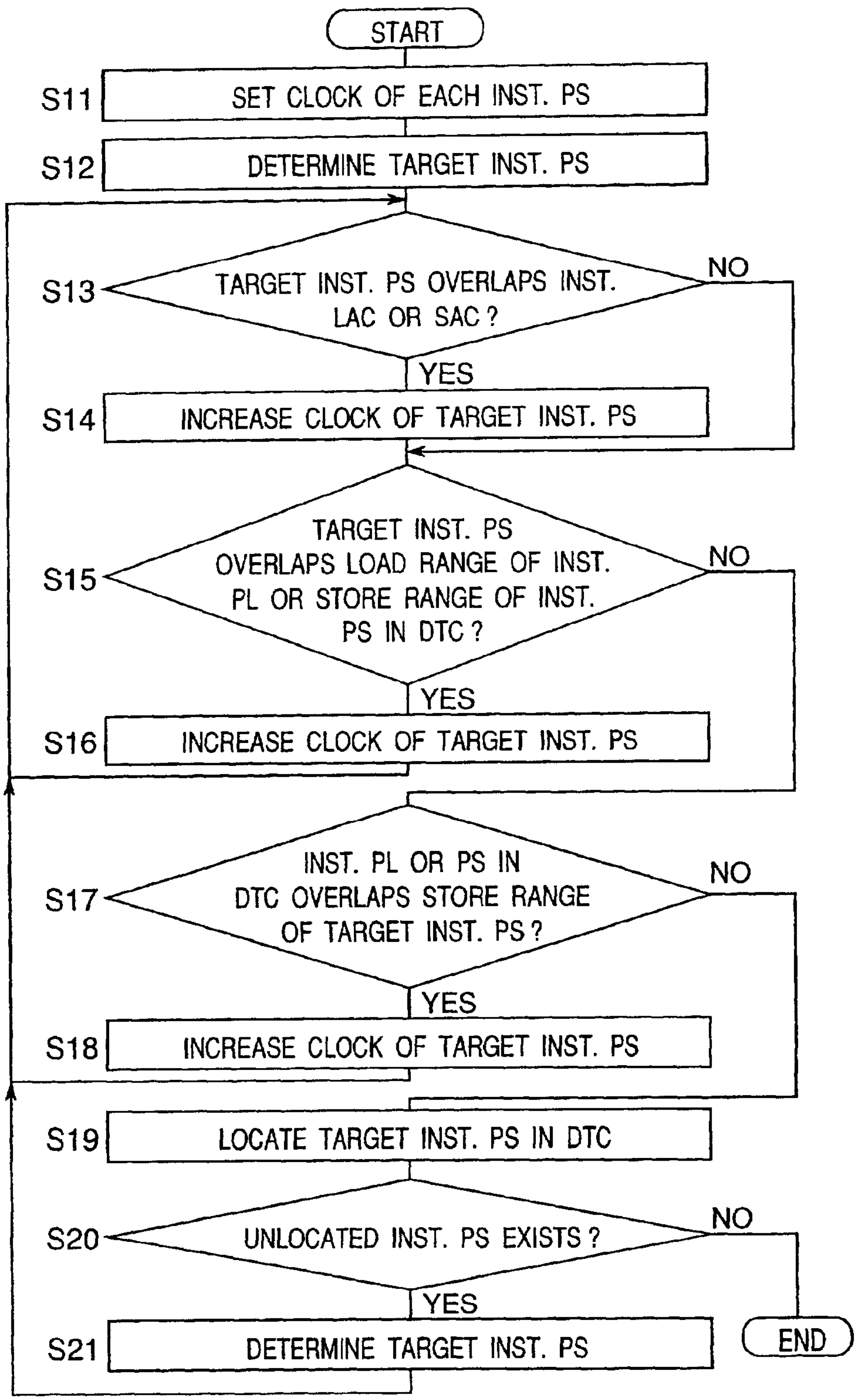
FIG. 12 is a flowchart showing a layout algorithm of an instruction PostStore (PS) produced by the compiler.

FIG. 12 is a flowchart showing a layout algorithm of the instruction PS produced by the compiler. A layout method of the instruction PS is described with reference to FIG. 12 in which processings of the program flow are performed by the compiler unless otherwise specified. In FIG. 12, at step S11, a clock obtained by adding one clock to a store instruction execution clock of the processor CPUi is initially set at a provisional execution clock of each instruction PS. Then, at step S12, an instruction PS having the smallest execution clock, namely, an instruction PS which is firstly executed is determined as a target instruction PS.

Thereafter, at step S13, it is found whether or not the target instruction PS overlaps the instruction LAC or SAC located already in the DTC instruction sting. In the case of "YES" at step S13, the execution clock of the target instruction PS is increased to a value at which the target instruction PS does not overlap the instructions LAC and SAC at step S14. Subsequently, it is found at step S15 whether or not the target instruction PS overlaps a load range of an instruction PL located at present in the DTC instruction code or a store range of an instruction PS located at present in the DTC instruction code. In the case of "YES" at step S15, the execution clock of the target instruction PS is increased to a value at which the target instruction PS does not overlap the load range of the instruction PL or the store range of the instruction PS at step S16. Then, the program flow returns to step S13. On the contrary, in the case of "NO" at step S13, the program flow proceeds to step S15.

Thereafter, in the case of "NO" at step S15, it is found at step S17 whether or not the instruction PL or PS located at present in the DTC instruction code overlaps a store range of the target instruction PS. In the case of "YES" at step S17, the execution clock of the target instruction PS is increased to a value at which the instruction PL or PS located already in the DTC instruction code does not overlap the store range of the target instruction PS at step S18. Then, the program flow returns to step S13.

Meanwhile, in the case of "NO" at step S17, the target instruction PS is located in the DTC instruction code at a present execution clock at step S19. Then, it is found at step S20 whether or not there are instructions PS which are not set in the DTC instruction code. In the case of "YES" at step S20, an instruction PS having the smallest execution clock in the instructions PS which are not set in the DTC instruction code is determined as the target instruction PS at step S21 and the program flow returns to step S13. Meanwhile, in the case of "NO" at step S20, the program flow is terminated.

As described above, the instructions PL and PS are located in the DTC instruction code by the compiler.

Figure 13:
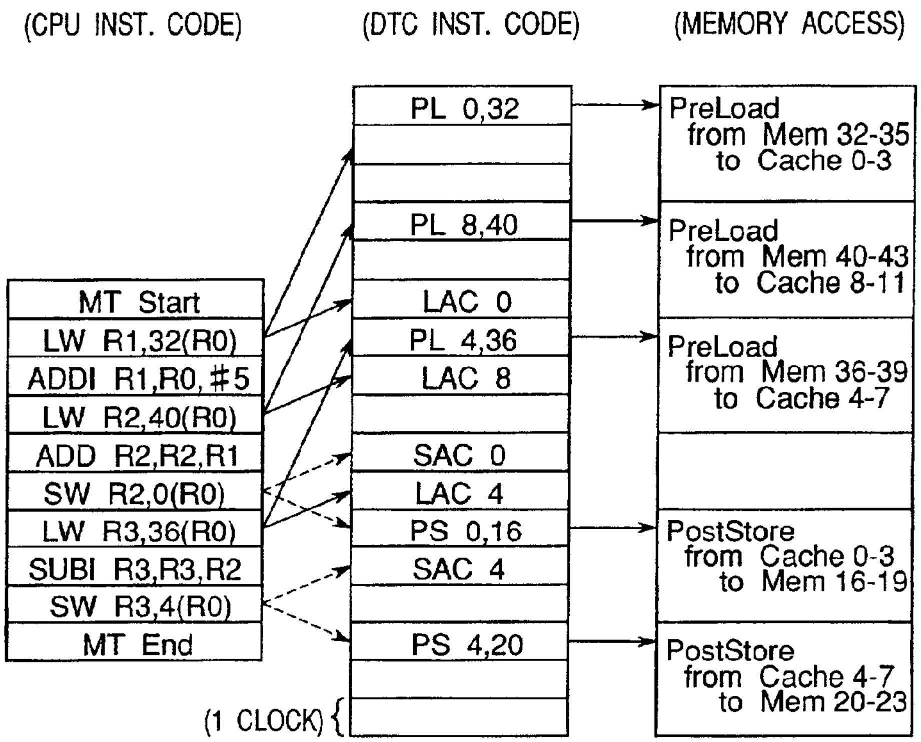
FIG. 13 is a view showing an example of a DTC instruction code produced by the compiler.
Figure 14:
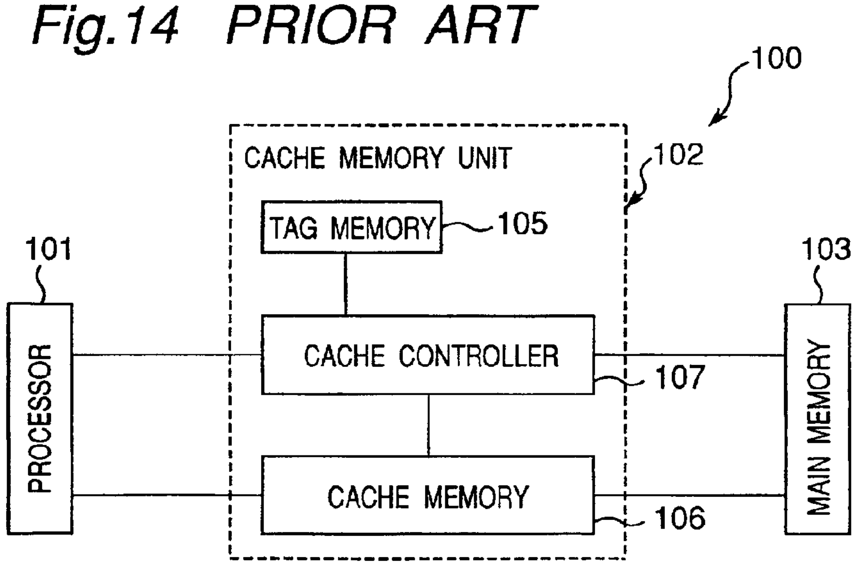
FIG. 14 is a schematic block diagram showing an example of a configuration of a prior art cache memory system.

FIG. 13 shows an example of the DTC instruction code produced by the compiler by using the above mentioned algorithms. In FIG. 13, the characters "LW" and "SW" in the column "CPU instruction code" represent the load instruction and the store instruction, respectively. In FIG. 13, the phrase "PreLoad from Mem 32–35 to Cache 0–3" in the column "Memory access" for accessing the centralized shared memory CSM represents that data at addresses 32–35 of the centralized shared memory CSM is preloaded to addresses 0–3 of the cache memory 6. Likewise, in the column "Memory access" for accessing the centralized shared memory CSM, the phrase "PostStore from cache 0–3 to Mem 16–19" represents that data at the addresses 0–3 of the cache memory 6 is poststored at addresses 1–19 of the centralized shared memory CSM.

As described above in the cache memory system 1 according to the embodiment of the present invention, the software control mode controlled by software and the DTC 8 for managing data transfer in the software control mode are added to a conventional cache memory system operating under hardware control and the algorithm for managing line information of the cache memory 6 when the program for the DTC 8 is produced is added to the compiler.

Thus, when static prediction of the compiler is possible in the software control mode, the DTC 8 preliminarily prepares, in accordance with the codes produced by the compiler, in the cache memory 6 data required for the processor CPUi. Meanwhile, when static prediction of the compiler is impossible in the software control mode, the DTC 8 dynamically prepares data in the cache memory 6 by calculating an address upon receiving information from the processor CPUi. Consequently, the processors can operate nonsynchronously without incurring a cache miss.

Meanwhile, in the above described embodiment, the cache memory system is used for the multiprocessor in which a plurality of the processors are operated nonsynchronously. However, the cache memory system of the present invention is not restricted to this embodiment but may also be applied to a single processor so as to improve a cache hit ratio and shorten a processing time.

As is clear from the foregoing description, the cache memory system of the present invention includes the software cache controller for performing software control and the hardware cache controller for performing hardware control. The processor causes the software cache controller to perform software control. In case it becomes impossible to perform software control due to, for example, a cache miss, the processor causes the hardware cache controller to perform hardware control. Thus, a cache hit ratio of 100% in an interval can be obtained and it is possible to materialize a multiprocessor in which a plurality of processors operate nonsynchronously.

Meanwhile, the software cache controller is arranged to store desired data in the cache memory in accordance with the code produced by static prediction of the compiler. Thus, a cache hit ratio of 100% in an interval can be obtained.

More specifically, before the processor executes a data read-out instruction for reading out desired data of the main memory, the software cache controller is arranged to read out data at the address of the main memory designated by the data read-out instruction and store the data in the cache memory. Thus, at the time of execution of the data read-out instruction such as the load instruction by the processor, a cache hit ratio of 100% can be obtained.

Furthermore, at the same time when the processor executes the data read-out instruction, the software cache controller is arranged to transfer from the cache memory to the processor the data at the address of the main memory designated by the data read-out instruction. Thus, it is possible to shorten processing time at the time of execution of the data read-out instruction such as the load instruction by the processor.

Meanwhile, more specifically, before the processor executes a data write instruction for writing data in the main memory, the software cache controller is arranged to designate an address of the cache memory, which is used for storing the data from the processor. Thus, at the time of execution of the data write instruction such as the store instruction by the processor, failure in data write in the cache memory can be eliminated.

In addition, when the processor executes the data write instruction, the data from the processor written at the designated address of the cache memory is adapted to be written by the software cache controller at the address of the main memory designated by the data write instruction. Thus, it is possible to shorten processing time at the time of execution of the data write instruction such as the store instruction by the processor.

On the other hand, the hardware cache controller is arranged to perform line management of the cache memory at the time of hardware control by using the set-associative method for the multiple ways. The software cache controller is arranged to perform line management of the cache memory at the time of software control by using the fully associative method for at least one way in the multiple ways. Thus, utilization efficiency of the cache memory can be raised without incurring drop of an access speed.

Meanwhile, more specifically, the software cache controller is formed by the transfer control processor for controlling data transfer to the cache memory. Thus, data transfer to the cache memory can be controlled in accordance with the preliminarily programmed software.

What is claimed is:

1. A cache memory system including a small-capacity cache memory which enables high-speed access and is provided between a processor and a main memory, comprising:

a software cache controller which performs software control for controlling data transfer to the cache memory in accordance with a preliminarily programmed software; and a hardware cache controller which performs hardware control for controlling data transfer to the cache memory by using a predetermined hardware;

wherein the processor causes the software cache controller to perform the software control but causes the hardware cache controller to perform the hardware control when it becomes impossible to perform the software control, when a cache miss happens at the time of the software control, the processor automatically causes the hardware cache controller to perform the hardware control, and the hardware cache controller performs line management of the cache memory by using a set-associative method for multiple ways, and the software cache controller performs line management of the cache memory by using a fully associative method for at least one way of said multiple ways and by using the set-associative method for at least another one way of said multiple ways.

2. A cache memory system according to claim 1, wherein the software cache controller stores desired data in the cache memory in accordance with a code produced by static prediction of a compiler.

3. A cache memory system according to claim 2, wherein before the processor executes a data read-out instruction for reading out desired data of the main memory, the software cache controller reads out data at an address of the main memory designated by the data read-out instruction and stores the data in the cache memory.

4. A cache memory system according to claim 3, wherein at the same time when the processor executes the data read-out instruction, the software cache controller transfers from the cache memory to the processor the data at the address of the main memory designated by the data read-out instruction.

5. A cache memory system according to claim 2, wherein before the processor executes a data write instruction for writing data in the main memory, the software cache controller designates an address of the cache memory, which is used for storing data from the processor.

6. A cache memory system according to claim 5, wherein when the processor executes the data write instruction, the data from the processor written at the designated address the cache memory is written by the software cache controller at an address of the main memory designated by the data write instruction.

7. A cache memory system according to claim 2, wherein the software cache controller is formed by a transfer control processor for controlling data transfer to the cache memory.

8. A cache memory system according to claim 1, wherein the software cache controller is formed by a transfer control processor for controlling data transfer to the cache memory.

* * * * *